Patented Mar. 13, 1951

2,544,887

UNITED STATES PATENT OFFICE 2,544,887

MANUFACTURE OF WATERPROOF PAPER

Arthur G. Leonard, Jr., Wilmington, Ill.

No Drawing. Application May 18, 1946,
Serial No. 670,836

2 Claims. (Cl. 92—21)

Ordinary paper is very absorbent. For example, cellulose wadding which is used in face tissues may absorb something like sixteen times its weight of water. Paper which is conventionally sized, as with rosin, may still absorb in the order of ten times its weight of water.

There have been efforts to make paper more waterproof without excessive cost or destroying its desirable qualities. For example, asphalt has been mixed with the paper-making ingredients in making special cellulose wadding for house insulation and the like. However, the product has still absorbed in the order of five times its weight of water. At least one resin has been used for wet-strength maps and the like but an expensive thermo-setting resin curable at very low temperature has been considered necessary.

According to the present invention, cellulose wadding may be rendered so water-proof at very low cost that it will absorb only one-fifth to one-half of its weight. This is accomplished by mixing Vinsol resin into the paper batch and subjecting the single sheet of very thin paper after it has been dried to sufficient heat to cause the resin to coat the fibers of the paper. It is old to mix Vinsol resin in a paper batch and consolidate one or more of the resulting sheets by heat and high pressure to make a fiber-board product. According to the present invention, much less resin is ordinarily used, and it is cured on the drier, substantially without pressure or other consolidation so that the resulting product is a water-proof cellulose wadding rather than a fiber-board.

The present invention is also concerned with the features of manufacture which make the manufacture practical by preventing gumming up the rolls and by preventing absorption of undesired materials into the blanket. Asphalt is mixed in the batch to prevent sticking to the rolls, and clay to prevent absorption of the asphalt by the blanket.

According to the preferred method, which has been found to be entirely satisfactory in commercial practice, the manufacture of the waterproof cellulose wadding proceeds by the following steps:

1. The conventional paper-making ingredients are placed in the paper beater and beaten up. Rags, old paper, and pulp wood could all be used. Scrap corrugated boxes have been found to be entirely satisfactory and the following steps will be described on the basis of the use of 100 pounds of scrap corrugated boxes to furnish the paper fibers.

2. After about seven minutes of beating, or when the material is well broken, seven pounds of Vinsol resin are added, this being the Vinsol resin sold as 200 mesh pulverized Vinsol resin. Vinsol resin is further described near the end of this description.

3. After about five minutes more beating, six pounds of asphaltic emulsion are added. This is an emulsion which is 40 per cent asphalt.

4. After this has been well mixed in, fourteen pounds of clay, preferably bentonite, are added.

5. After about ten minutes more beating and about five minutes before starting the paper run, alum is added, preferably in an amount to produce a pH of 4.0.

6. The paper run may be started after about five minutes more beating. It is run in such manner as to produce a dry paper sheet which, but for the water-proofing content, would be similar to ordinary face tissue. Specifically, it has a thickness of about .0025 inch, weighing, when creped to permit a stretch of approximately 40% about 4.8 lbs. per 1000 sq. ft.

7. The drier roll is subjected to a steam pressure of about fifty pounds, having a temperature of about 290° F. which is well above the melting point of the Vinsol. This temperature has been found to be satisfactory on a "Yankee" drier in which there is one big drying roll. The papers run at about 250 feet per minute and have 12 feet of contact so that it is in contact about three seconds. It appears to be dry when reaching about the last 30 inches and it is apparently in this zone that the Vinsol is sufficiently heated to coat the individual fibers of the paper.

8. The paper is then stripped from the drying roll with a creping blade, the drawing away speed determining the amount of crepe.

Of course the quantity of Vinsol used may be varied. Obviously, there will not be much further reduction in moisture absorption by using more, but when less water-proofing is required, less Vinsol may be used. The Vinsol is very much superior to asphalt alone. Under the microscope it appears that the Vinsol has coated the fibers quite uniformly while asphalt alone seems to do this only to a minor extent. Apparently, the melted Vinsol has a much greater tendency to wet the paper fiber, a sufficient tendency to do so so that at a temperature of 290° F. or less it tends to flow uniformly over the individual paper fibers. It will be observed in this connection that the paper sheet is so thin that all parts of it reach a temperature above the melting point of Vinsol. A sheet not much heavier, namely having the weight of paper toweling, cannot be made satisfactorily water-proof by the simple process above described. For such heavier papers, some less simple process is necessary to heat the paper above the melting point of the Vinsol throughout the paper without appreciably consolidating. This may be accomplished by carrying the paper through an oven, or through a heating zone through which it is heated through infra red lamps, of sufficient length for its heat to penetrate the paper. In place of the asphaltic emulsion, some other lubricant may be used, the purpose of the asphalt being primarily to prevent gumming up of the rolls and to prevent sticking of the paper to the rolls. Specifically, emulsified mineral oil or emulsified vegetable oil could be used.

The quantity of alum may be varied in accordance with paper-making practice, or it may be omitted.

Other materials commonly used in paper making may be added. For example, two pounds of dry rosin may be added with the Vinsol.

Vinsol resin is already well known and adequately described in papers and other literature. Reference may be had, for example to Patents 2,264,189, 2,130,239, and 2,115,496. It may be noted for present purposes that Vinsol type resin means a resin having the character of the residue low in abietic acid remaining after the separation of refined rosin high in abietic acid from the resinous material obtained by extraction of pine wood with a solvent.

Preferred method of manufacture set forth above is so satisfactory that the paper may be run twenty-four hours a day without trouble due to gumming up of the rolls or sticking to the rolls. Of course, less asphalt can be used so long as the gumming up or sticking is not regarded as excessive. Likewise, less clay may be used so long as the absorption of the asphalt into the blanket is not regarded as excessive.

I claim:

1. The method of manufacturing impregnated cellulose wadding consisting of the steps of mixing in a paper beater a quantity of cellulose fibres, about seven percent of their weight of Vinsol-type resin, about six per cent of their weight of asphalt emulsion to prevent gumming up or sticking in running the paper, and sufficient clay to prevent absorption of the asphalt in the blanket of the paper machine, forming a paper web from the mixture in a thickness of approximately .0025 inch, running the paper over a drier which dries the paper and heats it to approximately 290° F. and maintaining said contact for a sufficient time to melt the Vinsol throughout the paper to cause the Vinsol to flow over and coat the individual cellulose fibres.

2. The method of manufacturing impregnated cellulose wadding consisting of the steps of mixing in a paper beater a quantity of cellulose fibres, about seven percent of their weight of Vinsol-type resin, about six per cent of their weight of asphalt emulsion to prevent gumming up or sticking in running the paper, and sufficient clay to prevent absorption of the asphalt in the blanket of the paper machine, forming a paper web from the mixture in a thickness of approximately .0025 inch, running the paper over a drier which dries the paper and heats it to approximately 290° F., maintaining said contact for a sufficient time to melt the Vinsol throughout the paper to cause the Vinsol to flow over and coat the individual cellulose fibres, allowing said paper to cool to a finished state below a temperature suitable for consolidating the paper into a hard product, and throughout this treatment maintaining the paper free from the further application of liquid and free from a consolidating pressure to produce an unconsolidated paper.

ARTHUR G. LEONARD, Jr.

REFERENCES CITED

The following references are of record in the file of this patent:

UNITED STATES PATENTS

| Number | Name | Date |
|---|---|---|
| 1,802,561 | Kirschbraun | Apr. 28, 1931 |
| 1,975,286 | Pinoff | Oct. 2, 1934 |
| 2,115,496 | Maters | Apr. 26, 1938 |
| 2,130,239 | Hunter | Sept. 13, 1938 |
| 2,190,034 | Levin | Feb. 13, 1940 |
| 2,264,189 | Richter | Nov. 25, 1941 |

FOREIGN PATENTS

| Number | Country | Date |
|---|---|---|
| 541,670 | Great Britain | Dec. 5, 1941 |